(12) United States Patent
Aurongzeb et al.

(10) Patent No.: US 10,635,292 B2
(45) Date of Patent: Apr. 28, 2020

(54) INFORMATION HANDLING SYSTEM PREDICTIVE CONTENT NAVIGATION

(71) Applicant: Dell Products L.P., Round Rock, TX (US)

(72) Inventors: Deeder M. Aurongzeb, Austin, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

(21) Appl. No.: 15/594,780

(22) Filed: May 15, 2017

(65) Prior Publication Data
US 2018/0329580 A1   Nov. 15, 2018

(51) Int. Cl.
| | | |
|---|---|---|
| G06F 3/0482 | (2013.01) | |
| G06F 3/0488 | (2013.01) | |
| G06F 1/16 | (2006.01) | |
| G06F 3/0481 | (2013.01) | |
| G09G 5/00 | (2006.01) | |
| G06F 3/0487 | (2013.01) | |
| G09G 3/20 | (2006.01) | |
| G09G 5/14 | (2006.01) | |

(52) U.S. Cl.
CPC .......... *G06F 3/0488* (2013.01); *G06F 1/1641* (2013.01); *G06F 1/1652* (2013.01); *G06F 1/1677* (2013.01); *G06F 1/1694* (2013.01); *G06F 3/0481* (2013.01); *G06F 3/0487* (2013.01); *G09G 3/20* (2013.01); *G09G 5/00* (2013.01); *G09G 5/14* (2013.01); *G06F 2203/04803* (2013.01); *G09G 2340/14* (2013.01); *G09G 2370/24* (2013.01)

(58) Field of Classification Search
CPC .... G06F 3/0482; G06F 3/0346; G06F 3/0488; G06F 3/04847; G06F 1/1641; G06F 1/1647; G06F 2203/04803
See application file for complete search history.

(56) References Cited

U.S. PATENT DOCUMENTS

| | | | |
|---|---|---|---|
| 2010/0064536 A1* | 3/2010 | Caskey | G06F 1/1616 33/303 |
| 2014/0285449 A1* | 9/2014 | Cho | G06F 3/0412 345/173 |
| 2015/0331593 A1* | 11/2015 | Lee | G06F 1/1677 345/667 |
| 2016/0034059 A1 | 2/2016 | Graf et al. | |
| 2016/0259544 A1* | 9/2016 | Polikarpov | G06F 3/04886 |

OTHER PUBLICATIONS

Mohammadreza Khalilbeigi et al., FoldMe: Interacting with Double-sided Foldable Displays, 2012 https://hci.cs.uni-saarland.de/files/2012/11/p33-kahlibeigi.pdf.

* cited by examiner

*Primary Examiner* — Seth A Silverman
(74) *Attorney, Agent, or Firm* — Zagorin Cave LLP; Robert W. Holland

(57) ABSTRACT

An information handling system having a foldable display presents visual images in display zones defined upon detection of a folded display state. For example, a virtual bezel is generated at a foldable display based upon fold state, orientation state and application state so that applications are presented within a display zone to have touch selectively enabled or disabled within the virtual bezel.

19 Claims, 9 Drawing Sheets

FIG. 9

SAMPLE VIRTUAL BEZEL SIZE TABLE

| USER | APP | ORIENTATION | HANDS FREE | VIRTUAL BEZEL SIZE ||||  NOTES |
|---|---|---|---|---|---|---|---|---|
| | | | | LEFT | RIGHT | TOP | BOTTOM | |
| JOHN | KINDLE | VERTICAL | NO | 0.75 | 0.5 | 0.25 | 0.25 | HOLDING WITH LEFT HAND |
| JOHN | KINDLE | VERTICAL | YES | 0.5 | 0.5 | 0.25 | 0.25 | PLEASING MARGIN FOR BOOK |
| JOHN | KINDLE | HORIZONTAL | NO | 0.75 | 0.5 | 0.25 | 0.25 | HOLDING WITH LEFT HAND |
| JOHN | KINDLE | HORIZONTAL | YES | 0.25 | 0.25 | 0.25 | 0.25 | PLEASING MARGIN FOR BOOK |
| JOHN | NETFLIX | VERTICAL | NO | 0.25 | 0.25 | 0.25 | 0.75 | HOLDING WITH BOTH HANDS AT THE BOTTOM |
| JOHN | NETFLIX | VERTICAL | YES | 0 | 0 | 0 | 0 | MAXIMIZING VIEWING AREA |
| JOHN | NETFLIX | HORIZONTAL | NO | 0.75 | 0.75 | 0 | 0 | HOLDING WITH BOTH HANDS ON THE SIDES |
| JOHN | NETFLIX | HORIZONTAL | YES | 0 | 0 | 0 | 0 | MAXIMIZING VIEWING AREA |
| JANE | KINDLE | VERTICAL | NO | 0.5 | 0.75 | 0.25 | 0.25 | HOLDING WITH RIGHT HAND |
| JANE | KINDLE | VERTICAL | YES | 0.5 | 0.5 | 0.25 | 0.25 | PLEASING MARGIN FOR BOOK |
| JANE | KINDLE | HORIZONTAL | NO | 0.5 | 0.75 | 0.25 | 0.25 | HOLDING WITH RIGHT HAND |
| JANE | KINDLE | HORIZONTAL | YES | 0.25 | 0.25 | 0.25 | 0.25 | PLEASING MARGIN FOR BOOK |

THUMB/PALM DETECTION TO DEFINE VIRTUAL BEZEL SIZE
DYNAMIC BEZEL SIZING BASED ON WHERE THE THUMB/PALM IS DETECTED — 66 ns, end users can struggle in the management of information handling system settings. Yet, with a foldable display, the nature of information presented to an end user can change quickly based upon the relative location of housing portions to each other. For example, a foldable display essentially transitions between a contiguous single display surface to a dual display with distinct display surfaces when the housing portions rotate relative to each other. Such a reconfiguration can confuse an end user where icon and application stack provisioning for the single display presentation do not match the seam formed at a folded display.

INFORMATION HANDLING SYSTEM PREDICTIVE CONTENT NAVIGATION

BACKGROUND OF THE INVENTION

Field of the Invention

The present invention relates in general to the field of information handling system information presentation, and more particularly to information handling system predictive content navigation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically include integrated input/output (I/O) devices and integrated power in a portable housing to support end user interactions free from external cables and peripheral devices. One common form factor is a laptop housing having rotationally-coupled housing portions. A typical laptop housing includes an integrated keyboard in one housing portion and an integrated display in another rotationally-coupled housing portion. The housing portions rotate to a substantially perpendicular orientation so that the display is positioned above the keyboard for convenient end user inputs. In some instances, laptop rotationally-coupled portions rotate 180 degrees to a flat orientation and 360 degrees to a tablet orientation. Where the display includes a touchscreen, rotation to a tablet orientation provides and end user with a convenient form factor for making touch inputs with one hand while holding the housing with another hand. Another common information handling system form factor is a tablet housing that has a planar form. Tablet information handling systems typically have a touchscreen display integrated on one side of the planar housing that is used as the primary input device, such as with a virtual keyboard presented on the touchscreen display. In some instances, tablet information handling systems couple to a base that includes a physical keyboard so that an end user can interact with the tablet information handling system in a manner similar to a laptop information handling system. For example, the keyboard base has a hinge in it so that the tablet rotates relative to the base.

One disadvantage of portable information handling systems that have rotating housing portions is that the hinges integrated in the housing tend to add weight and thickness to the housing. Further, the housing portion that supports the display generally must have a robust structure that resists torsional forces applied to the display. For example, liquid crystal displays (LCDs) generally have a flat surface with liquid crystals adapting a backlight to generate a visual image. Excessive movement of an LCD alters the effect provided by the backlight and wears on the circuitry that communicates with the liquid crystals.

Recently organic light emitting diode (OLED) displays have provided an alternative display solution for portable information handling systems. OLED displays generate light at each pixel rather than relying on a backlight. OLED films are flexible in nature so that they fit on and over curved housing portions, giving what is effectively a bezel free display presentation where displayed images are presented across the entire housing face. In addition, OLED films provide a flexible material that allows folding of the display after integration of the display into a housing. A narrow or zero border foldable display enhances end user experience by providing a larger relative viewing area for an end user across the front face of the portable housing. However, presenting content at the full front face of the housing can cause end user confusion as control buttons are more difficult to locate and interact with. For example, a virtual bezel or icon stacking at the bottom of an OLED display provides a convenient area for an end user to grab the housing and to control display presentation, connectivity, battery power, speaker volume and other functions. Without some direction on the display that describes how to perform such interactio

SUMMARY OF THE INVENTION

Therefore, a need has arisen for a system and method which provide information handling system predictive content navigation.

In accordance with the present invention, a system and method are provided which substantially reduce the disadvantages and problems associated with previous methods and systems for management of content presentation at a foldable information handling system display. Display configuration is managed to adapt presented information to orientation, fold and application state states. A virtual bezel is selectively presented to aid definition of display areas, guide end user touch interactions and indicate display zones that do not detect touches.

More specifically, an information handling system processes information with a processor and memory that cooperate to execute instructions. Visual information is processed by a graphics processor into pixel values that define visual images on a display. A housing having rotational portions supports a contiguous display film that extends over both portions and folds as the portions rotate. A display format module interfaced with the graphics processor and plural sensors adapts visual information presented at the display based upon the display flat or folded configuration, applications stacked for presentation on the display and display orientation. The display has a single display mode with the housings in a flat configuration and transitions to a multi-display mode as the housing flexes or folds. For example, a housing fold seam defines two display areas that present information in the two display mode. In addition a virtual bezel highlights display zones, such as those defined by a fold seam and define non-touch zones identifiable by an end user during hand grasp or other manipulation of the housing.

The present invention provides a number of important technical advantages. One example of an important technical advantage is that a foldable display readily adapts presentation of information based upon fold state so that end user interactions with the display are more natural and easy to understand. A virtual bezel helps an end user to understand the system configuration. For example, placing a virtual bezel and tool bar guides an end user to know which way to hold a system to interact with a camera, such as during a videoconference. As another example, application windows are more effectively stacked to adapt to fold state so that an end user has relevant information available in a display sense most useful and desired for the end user's planned interaction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 9 depicts an example of a display format table.

DETAILED DESCRIPTION

An information handling system display presentation automatically adapts to changes in fold and orientation state. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
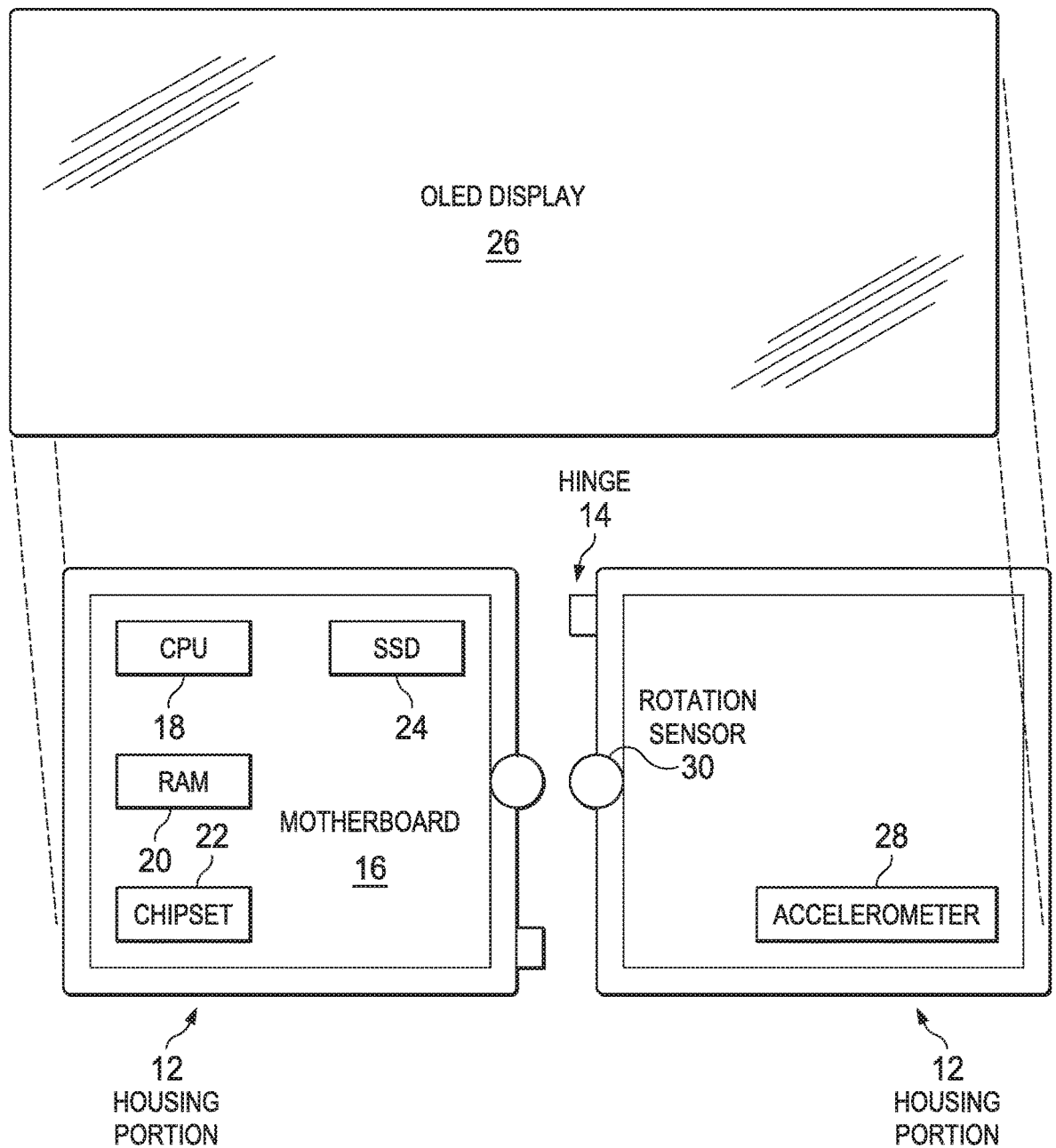
FIG. 1 depicts a blown-up view of an information handling system having a foldable display integrated in rotationally-coupled housing portions.

Referring now to FIG. 1, a blown-up view depicts an information handling system 10 having a foldable display 26 integrated in rotationally-coupled housing portions 12 that rotate relative to each other about hinges 14. Display 26 presents visual images at a flexible film, such as an organic light emitting diode film that flexes in response to motion of underlying structures. For example, a motherboard 16 supports communication between a central processing unit (CPU) 18, random access memory (RAM) 20, a chipset 22 and a persistent storage device like a solid state drive 24. Chipset 22 includes graphics processing resources to adapt visual information generated by CPU 18 into pixel values that define images presented on display 26. Additional processing components and embedded code in chipset 22 manage presentation of visual images at display 26 to adapt to changes in orientation and folded configuration of display 26. For example, accelerometer 28 detects orientation of display 26 relative to gravity and a rotational sensor 30 detects the relative rotation of housing portions 12 to each other.

In operation, information handling system 10 detects orientation and fold state to provision applications and format display areas that adapt to seamless usage models. An end user's housing holding pattern is learned over time and used to suggest to the user or automatically provision one or more different patterns along the display as a virtual bezel area. For example, an application window is provisioned incrementally after the location of a holding point at the display is identified so that the application information is presented in a non-touch area that avoids visual blocking of application images by a hand grasp. Upon detection of rotation of display 26, such as between landscape and portrait orientations, the application stacking is reset and new presentation areas are defined that adapt application windows not only to orientation but also to fold configuration. An application aware policy manages presentation of application windows based upon a flat single display mode or a folded dual display mode in which a fold seam defines display zones. A similar policy manages presentation of a virtual bezel at the perimeter of each display zone to differentiate presentation areas and to guide end user grasps and touches. For example, a virtual bezel may be removed entirely when not needed, such as while watching a movie or provisioned based upon tasks and applications. In one embodiment, a timeout may guide virtual bezel placement and presentation so that an entire display become available after a defined time passes without a touch. End user inputs may also define application stacking and virtual bezel placement so that over time the information handling system learns and applies end user preferences.

Figure 2:
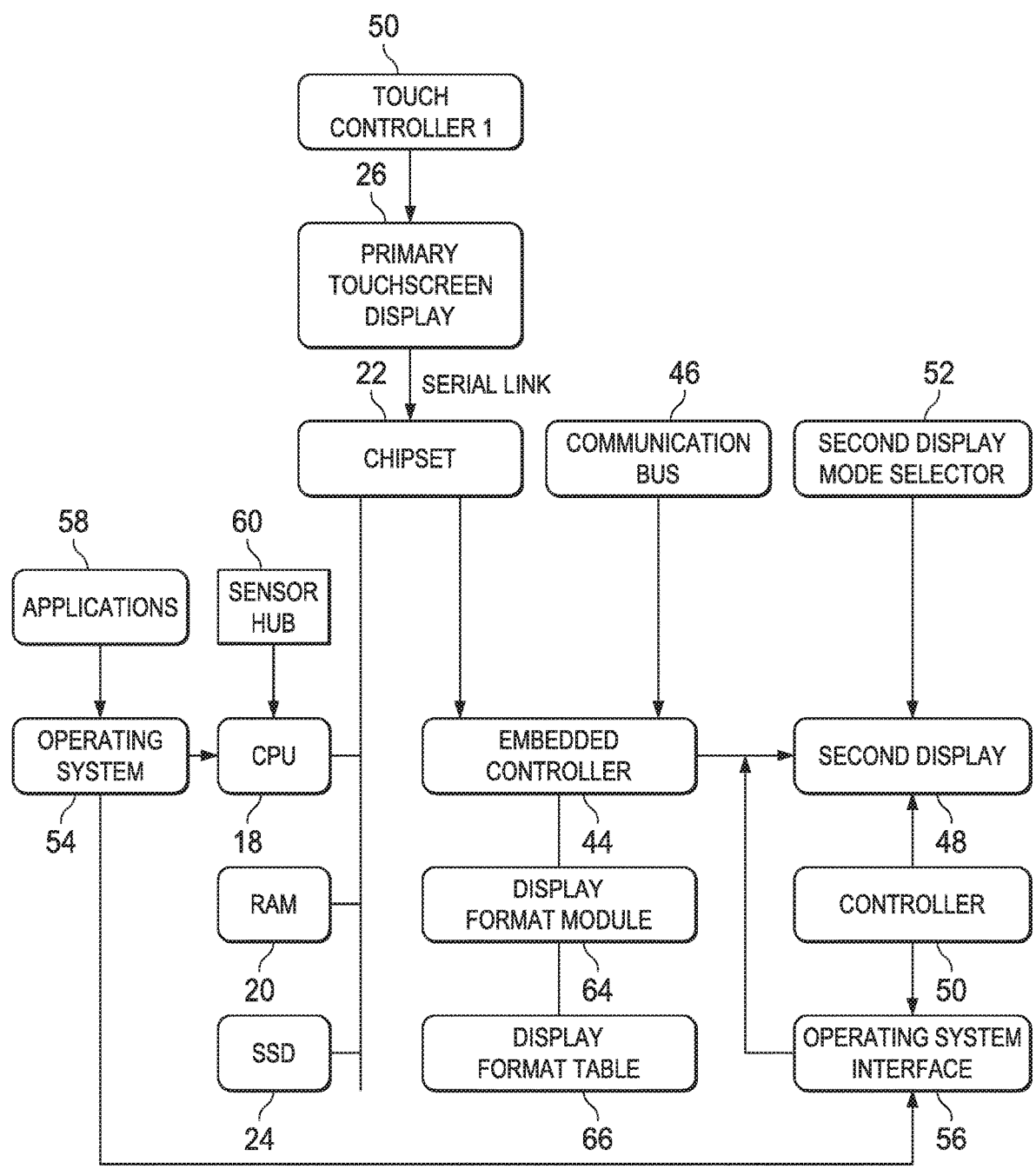
FIG. 2 depicts a block diagram of an information handling system having automated display formatting.

Referring now to FIG. 2, a block diagram depicts an information handling system 10 having automated display formatting. In the example embodiment, CPU 18 and RAM 20 retrieve an operating system 54 and applications 58 from a solid state drive 24 to execute instructions that process information for presentation of visual images at display 26.

For example, chipset 22 includes graphics processing that generates pixel values to define visual images that are sent to a primary display 26 or secondary display 48. An embedded controller 44 executes embedded code stored in flash memory to manage interactions with input devices, such as a keyboard, mouse and touches detected by touch controllers 50. Peripheral and wireless devices send inputs through a communication bus 46 to embedded controller 44. An operating system interface 56 manages presentation of input interfaces at second display 48, which an end user may manually select for presentation mode through a mode selector 52. In the example embodiment, presentation of first and second display areas may be managed on an operating system level by treating the display areas as separate displays 26 and 48. Alternatively, presentation of first and second display areas may be managed through definitions provided through a single graphics controller managing just primary display 26.

In the example embodiment, a display format module 64 executing as embedded code on embedded controller 44 manages presentation of display areas based upon sensor inputs from a sensor hub 60 and by applying settings in a display format table 66. For example sensor hub 60 provides orientation information for display 26 that defines transitions between landscape and portrait modes and provides rotational information for the configuration of housing portions relative to each other. Display format module 64 applies orientation and rotation information to define whether to present visual images in a single or dual display mode, to define the orientation for the presentation of the visual images, to define the application stack in each display mode area and to define the location and size of a virtual bezel for the display as a whole and/or for display mode areas. Display format module 64 determines the display presentation format desired by an end user by monitoring end user selections over time and saving end user preferences in display format table 66, thus presenting a display format mode predicted as the end user preference. For example, display format module 64 monitors end user inputs at the display mode selector 52 to indicate end user preferences for presenting single or dual mode display areas at different display fold and orientation states, such as the degree of fold of housing portions. As another example, display format module 64 monitors end user application window placement in different display configurations to determine end user preferences for application stacking of application windows in single and dual display modes at different fold degrees and orientation angles. Similarly, end user selection of virtual bezel usage and end user touches while holding information handling system 10 define virtual bezel preferences for display format module 64 to apply as display fold angle and orientation change.

Figure 3:
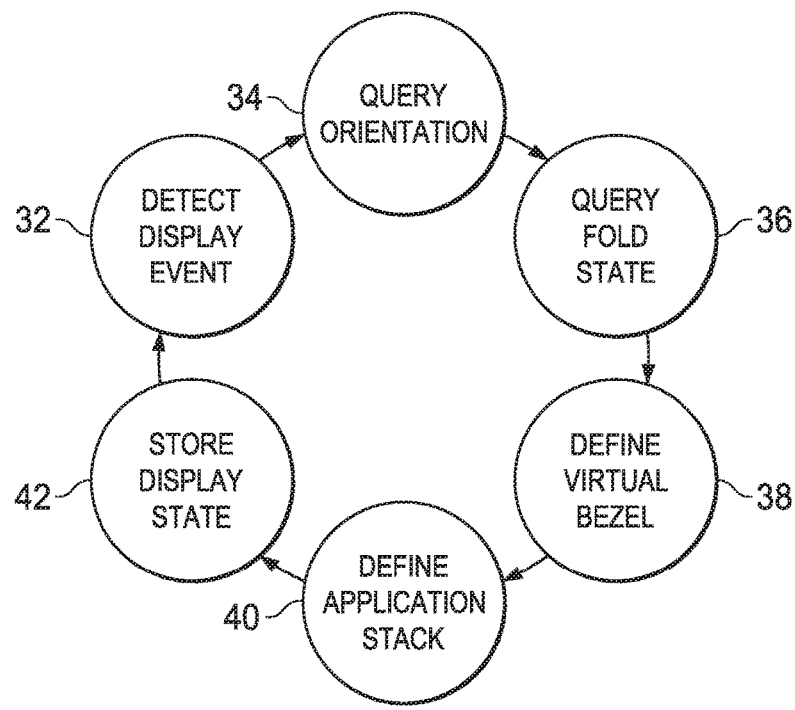
FIG. 3 depicts a state diagram of display format control based upon display orientation and fold state.

Referring now to FIG. 3, a state diagram depicts display format control based upon display orientation and fold state. A change of state initiates at step 32 with detection of a display event, such as a change in orientation, a change in fold angle, or a change in end user grasp. At step 34, the orientation is queried and at step 36 the fold state is queried. At step 38, a virtual bezel is defined for the display based upon the orientation state, fold state and touches detected at the display. For example, a change in state that is initiated by an end user grasp may result in a non-detect zone related to the grasp so that touches related to the grasp are ignored and having a virtual bezel presented at the non-detect zone. At state 40 an application stack is defined for presenting application windows of active and inactive applications executing on the information handling system. For example, the application stack may define placement of different sized application windows on the display for different orientation, fold and touch states. At step 42 the display state is stored for reference in determining application window and virtual bezel settings predicted based upon end user preferences. For instance, as automated settings are overridden by end user interactions, end user selected setting are provided with a higher preference for application to subsequent state changes.

Figure 4A:
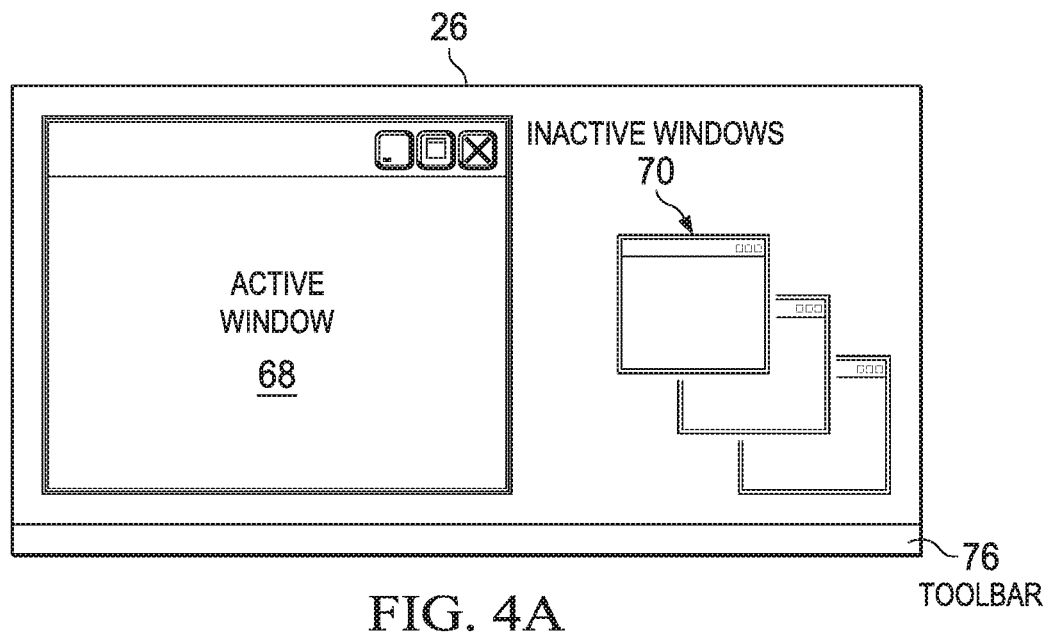
FIGS. 4A, 4B, 4C, and 4D depict examples of display presentation based upon orientation and fold state.
Figure 4B:
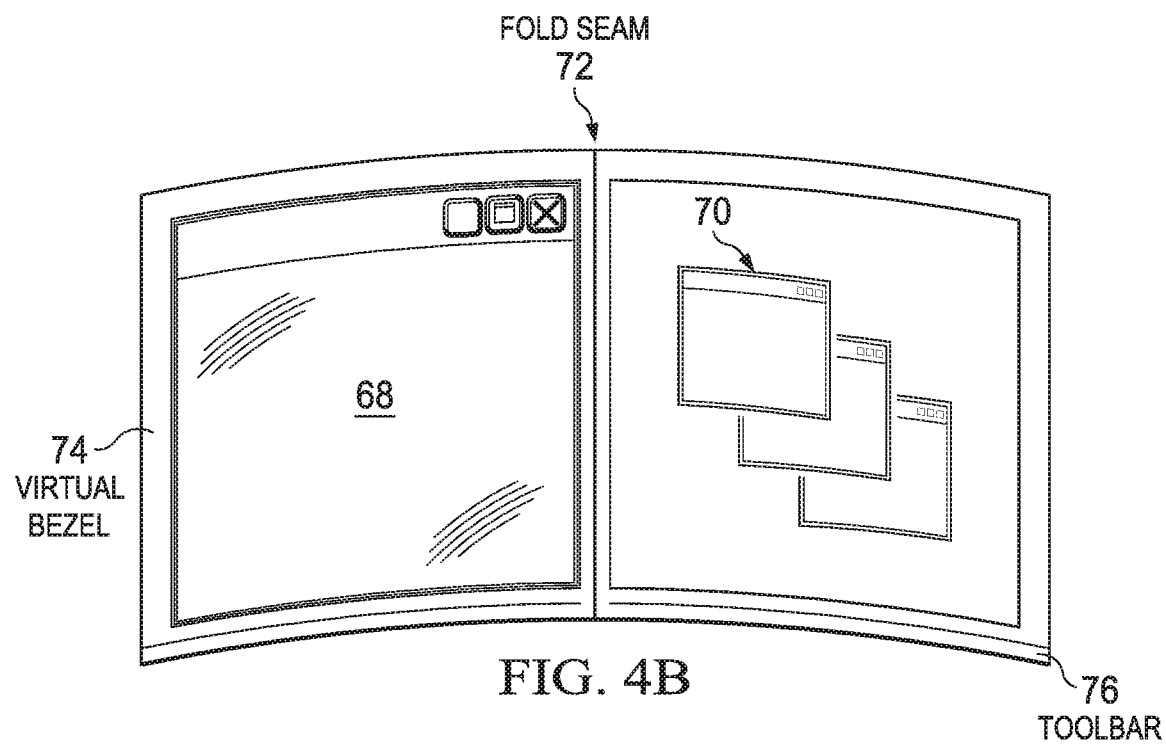
Figure 4C:
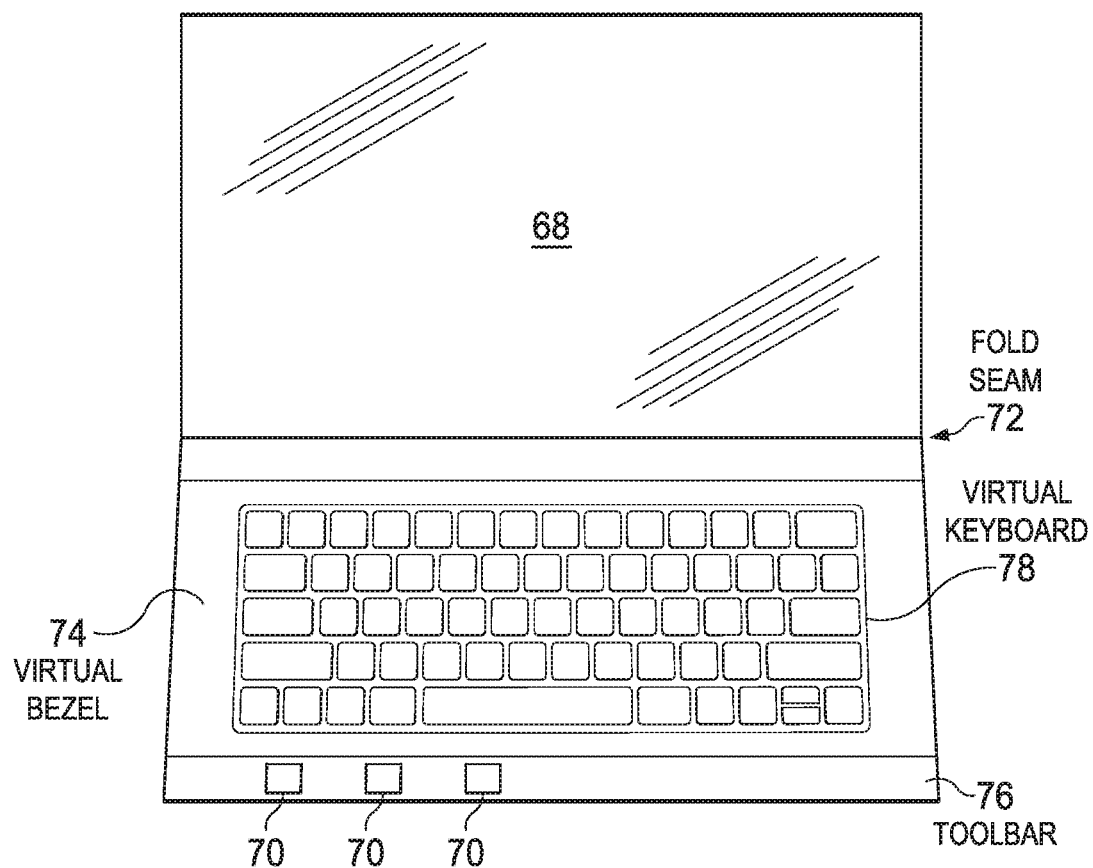

Referring now to FIGS. 4A, 43 and 4C examples depicts display presentation based upon orientation and fold state. In FIG. 4A, display 26 presents an active window 68 and plural inactive windows 70 across a flat display area that does not have any fold seams. An end user interacts with display 26 as a tablet configuration that allows the end user to select presentation of active window 68 at varying sizes including a full screen viewing mode, such as when a video is playing. In the example embodiment, no virtual bezel is presented so that the entire display area is available to accept touch inputs from the end user. In the event of an end user grasp, a virtual bezel may be placed around all or part of the perimeter of display 26. For example, if an end user grasps one side of display 26, a virtual bezel presented at that side only indicates to the end user the area where touches will be ignored as inputs while the other edges of the display continue to present visual information. Over time, end user grasp patterns are monitored so that predictions of grasp patterns for various orientation, fold and application states may be applied to generate virtual bezel presentations.

In FIG. 4B, one example is depicted of display presentation settings applied where the display of FIG. 4A is folded at a fold seam 72. In the example embodiment, active window 68 is resized by the operating system to fall into a display area defined by one side of fold seam 72 and inactive windows 70 are resized to fit into a display area defined by the other side of fold seam 72. Each separate display area has a virtual bezel 74 that defines the perimeter of the display area, including a virtual bezel on each side of fold seam 72. In one embodiment, the virtual bezel 74 is presented for a temporary time period upon display configuration so that the end user has notice of the configuration and then the virtual bezel is remove in whole or in part, For instance, upon detection of the fold, the virtual bezel highlights the fold seam 72 for a number of seconds and is then removed while the virtual bezel around the perimeter of display 26 remains for a longer time period until end user touches from a grasp are identified, at which time virtual bezel 74 is adjusted to a presentation for the detected grasp or lack of grasp.

In FIG. 4C, one example is depicted of display presentation settings applied where the display of FIG. 4A is rotated in orientation and folded greater than a predetermined amount, such as 45 degrees. In the example embodiment, active window 68 expands to fill the display space on the upper portion of display 26 above fold seam 72 without a virtual bezel, and inactive windows 70 are minimized to toolbar 76 icons on the other side of fold seam 72 to make room for presentation of a virtual keyboard 78. A virtual bezel 74 outlines display 26 to define no or limited touch functionality. In alternative embodiments, inactive windows 70 may be depicted on a side of display 26 or along fold seam 72. The depicted display presentation is an example and does not limit application of other types of configurations. For example, end user interactions over time aid in prediction of end user display configurations so that application windows and virtual bezels are presented in a manner preferred by the end user.

Figure 4D:
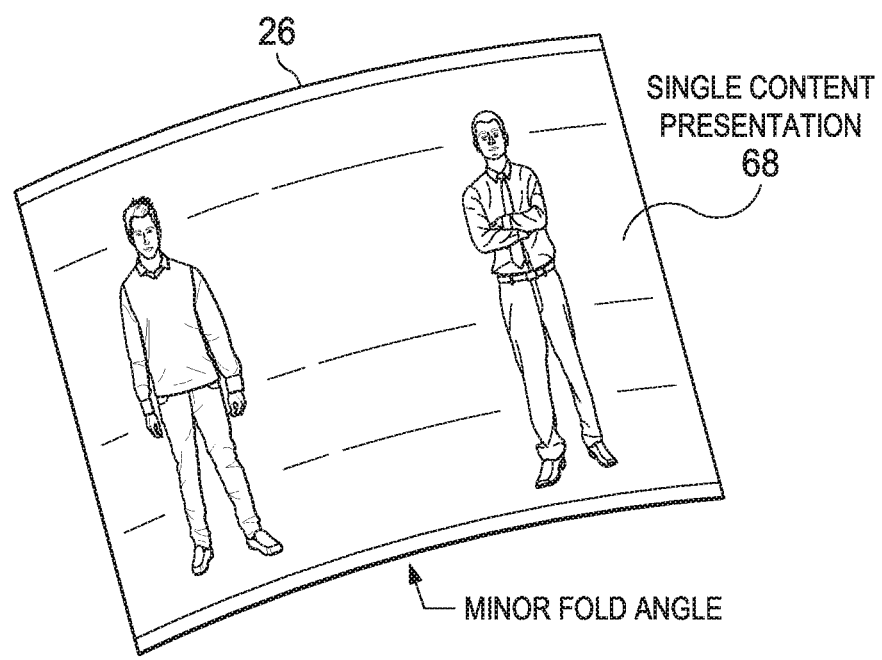

Referring now to FIG. 4D, in various embodiments the amount of fold made at a display may impact the display presentation settings applied at the display. For example, a display may partially fold or roll to have a curved portion similar to a partially turned page of paper. An end user may elect to curve a portion of a display to enhance overall viewing of a single display content with enhanced privacy rather than to partition the display into multiple parts. Thus, folding or curving the display may have multiple definitions, such as a major fold that partitions display viewing, a major fold that enhances secure viewing of one display content area, and a minor fold that enhances content viewing. Over time, by observing end user selections, virtual bezel placement and display area definitions may selectively be engaged a different fold or curve angles.

Figure 5:
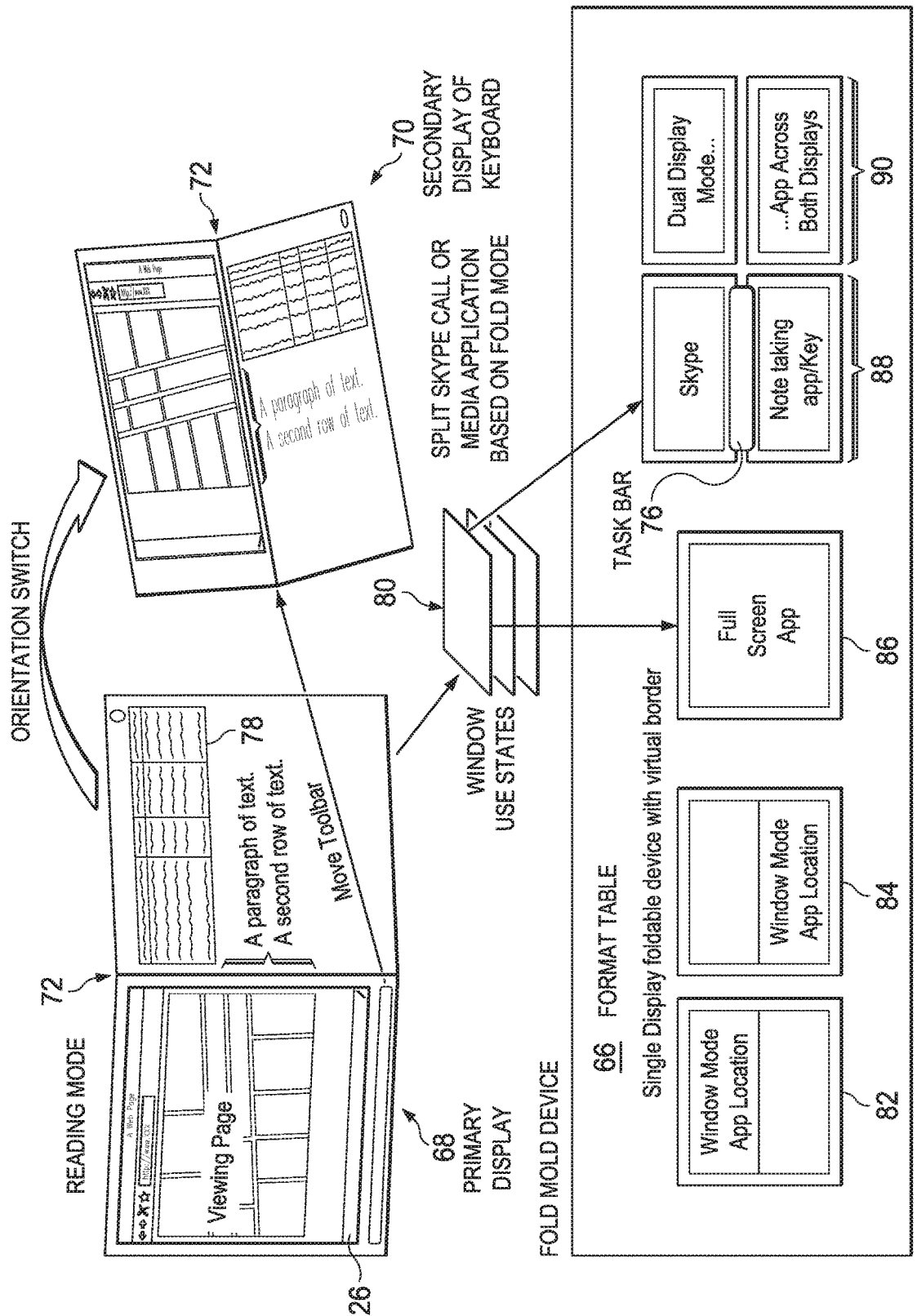
FIG. 5 depicts an example of display presentation based upon orientation change and application stack.

Referring now to FIG. 5, an example depicts display presentation based upon orientation change and application stack. In the example embodiment, display 26 is rotated from a landscape to portrait orientation where the content is presented as different pages on each side of a fold seam 72. A tool bar 76 that was presented on a bottom surface of one display portion is expanded to run along the entire length of the fold seam 72 between the page contents. In the example embodiment, a display stack 80 of open applications is applied based upon the fold state and orientation change to a format table 66 to determine the display format to use with the new display state. Format table 66 is graphically depicted to show that the new display orientation could have the display portion presented with content in a top portion 82, a bottom portion 84 and a full screen portions 86, each with a virtual bezel included around the display perimeter. In the display area depicted by 88, an active application of a skype videoconference window is depicted with the video portion open on a top portion of display 26 and a note taking portion open on the lower portion of display 26. In the dual display mode depicted by 90, an application split defines application windows to stay in just one side of seam fold 72 on detection of the fold so that visual images are not split across the fold for any of the open applications.

Figure 6:
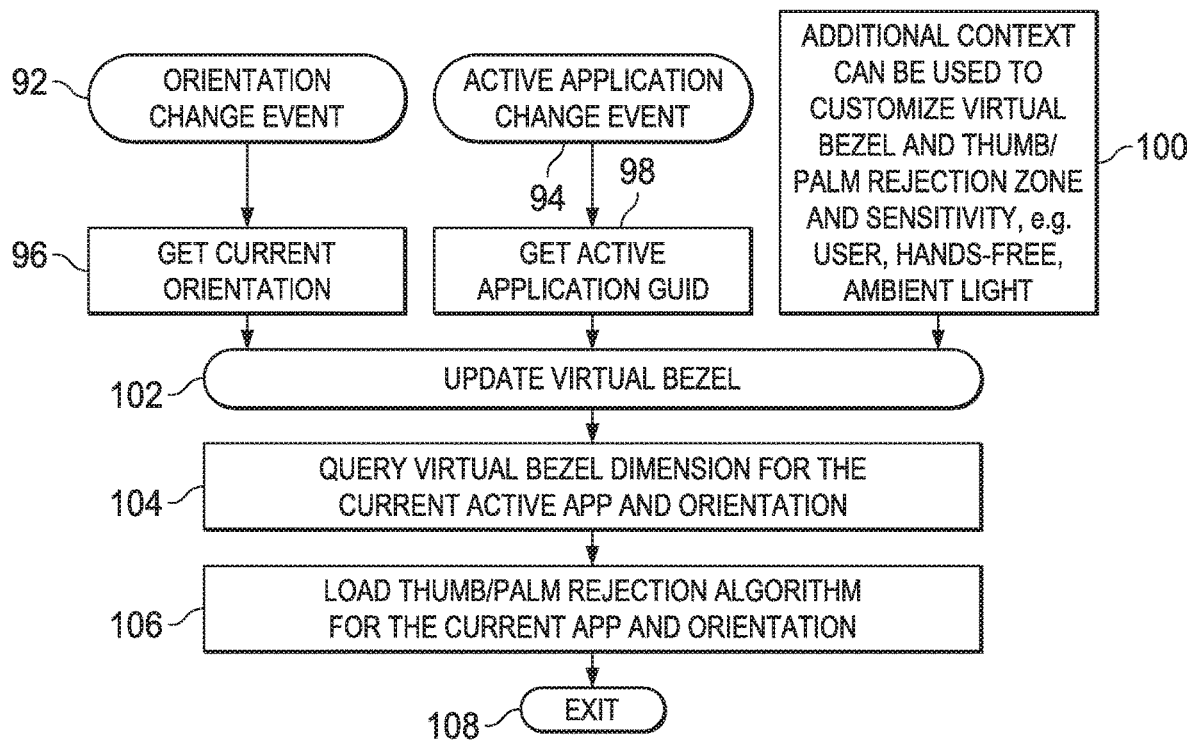
FIG. 6 depicts a flow diagram of a process for predictive content navigation with virtual bezel provisioning.

Referring now to FIG. 6, a flow diagram depicts a process for predictive content navigation with virtual bezel provisioning. The process starts with step 92 upon detection of an orientation change event or step 94 upon detection of an active application change event. As is depicted by element 100, other types of events may initiate the bezel provisioning, such as a touch event, a change of palm and touch rejection zones, a hands free detection, a change in ambient light or a network event, such as an incoming telephone call or video conference. If an orientation change event is detected, the process continues to step 96 to retrieve the current orientation. If an active application change event occurs, such as opening, closing or changing focus of an application, the process continues to step 98 to get the active application graphical user identifier. At step 102, the virtual bezel is updated based upon the retrieved information and touch detected, such as a user grasp. At step 104, the virtual bezel dimension for the active application and orientation is queried. At step 106 the thumb and palm rejection algorithm is applied to current application and orientation information and the process ends at step 108.

Figure 7:
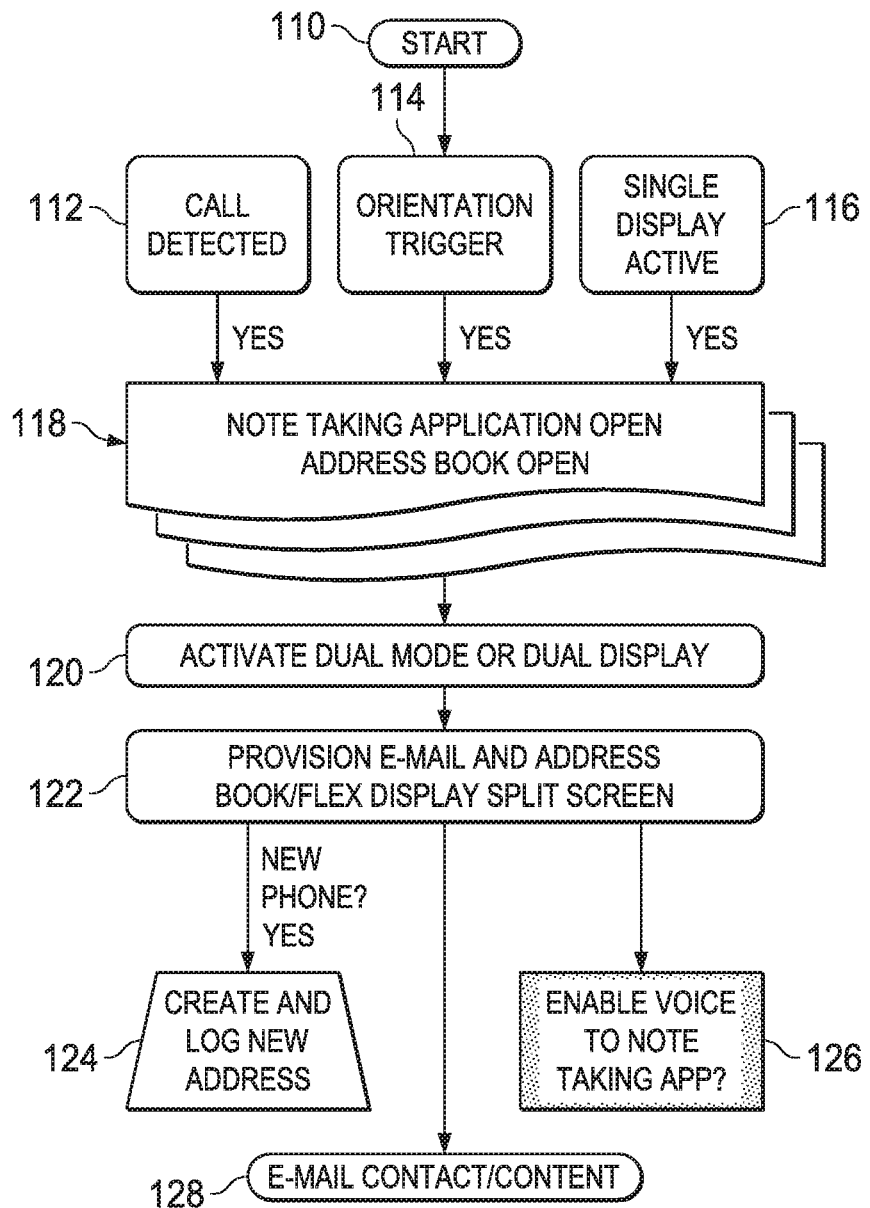
FIG. 7 depicts a flow diagram of a process for application stacking display presentation.

Referring now to FIG. 7, a flow diagram depicts a process for application stacking display presentation. The process starts at step 110 and determines the source of the application stacking event. At step 112, a call for an application is detected; at step 114 a change in orientation is detected; and/or at step 116 a single display is active so that applications share the display area. At step 118 in the example embodiment, a note taking application and address book are open, such as may indicate an end user intention to stare a telephone call, video conference, messaging application or email application. In the example embodiment, at step 120 the application called, orientation and single display active mode indicate that a transition should occur from the single to the dual mode for showing two display areas. For example, in a folded display having a folded configuration, a display area is defined on each side of the fold. At step 122, email and an address book are opened in a flexible display split screen where the email application is in one display zone and the address book in the other. If an end user enables voice recognition to take notes the process continues to step 126. If the end user initiates a new contact, such as a new phone number, the process continues to step 124. If the end user initiates preparation of an email, the process continues to step 128. In various embodiments, end user preferences and interactions over time modify the display presentation response to adapt to end user preferences.

Figure 8:
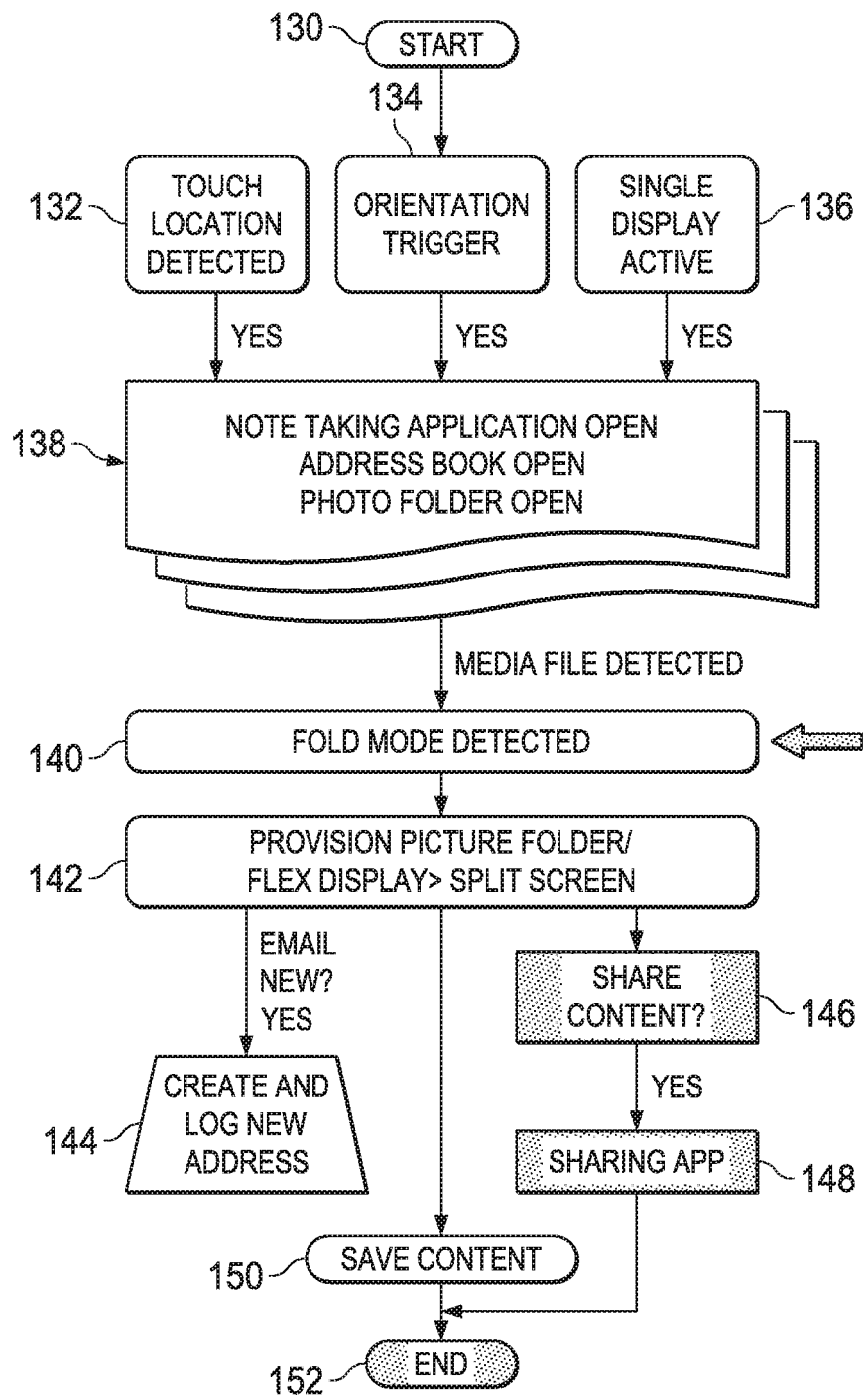
FIG. 8 depicts a flow diagram of a process for display fold state interactions at display presentation.

Referring now to FIG. 8, a flow diagram depicts a process for display fold state interactions at display presentation. The process starts at step 130 and determines the source of the fold event. At step 132 a touch location is detected, at step 134 an orientation trigger is detected and at step 136 a single display active mode is detected. At step 138, the application stack is queried to determine that a note taking application is open, an address book is open and a photo folder is open. At step 140 a media file is found for presentation and the fold mode is detected, indicating the presence of a fold seam on the display. At step 142, the picture folder is provisioned to one display area and the note taking application is provisioned to another display area in a split screen defined by the fold seam formed by the flexible display. At step 144, if a new email is detected, the email is added to an address book based on the end user interactions with that display zone. If sharing of content is selected, a sharing application is opened for access by the end user, with display zone for presenting the sharing application determined based on the selected sharing communication method. At step 150, the media is saved and the process ends at step 152.

Referring now to FIG. 9, an example of a display format table is depicted. Table 66 saves user preferences for configuration of display zones based upon analysis of user selections and a prediction of what the user would prefer on a next occurrence of saved conditions. In the example table 66 a reading application has virtual bezel size values stored for vertical and horizontal orientations based upon the user's hand position or a hands free configuration. In other embodiments, table 66 includes virtual bezel sizes for fold and flat configurations as well as for other display configurations and application combinations.

Although the present invention has been described in detail, it should be understood that various changes, substitutions and alterations can be made hereto without departing from the spirit and scope of the invention as defined by the appended claims.

What is claimed is:

1. An information handling system having predictive content navigation, the information handling system comprising:
   a housing having at least first and second portions that move relative to each other;
   a processor disposed in the housing and operable to process information;
   a memory interfaced with the processor and operable to store the information;

a graphics processor interfaced with the processor and operable to process the information to generate pixel values for presenting the information as visual images on a display;

a touchscreen display disposed over the first and second portions as a contiguous foldable surface, the display transitioning between flat and folded configurations responsive to movement of the housing portions relative to each other, the folded configuration having a seam defined by the location of the first and second portions;

plural sensors integrated in the housing and operable to detect the display configuration and the display orientation; and a display format module interfaced with the graphics processor and plural sensors, the display format module operable to adapt visual information presented at the display based upon at least the display flat or folded configuration;

wherein the display format module selectively presents a virtual bezel at the display based upon one or more predetermined factors, in the flat configuration the virtual bezel being placed at the perimeter of the folded display and the visual information presented over the seam, in the folded configuration the virtual bezel defining boundaries between first and second display zones with the virtual bezel being disposed over the seam to divide visual information presented in the first and second display zones, the display format module removing the virtual bezel after a predetermined time associated with an end user orientation to the first and second display zones.

2. The information handling system of claim 1 wherein:
the visual information comprises plural application windows; and
the display format module presents the plural application windows in a dual display mode if a folded configuration is detected and a single display mode if a flat configuration is detected.

3. The information handling system of claim 2 wherein the display format module selectively presents a tool bar across the entire edge of one side of touchscreen display when presenting visual information in the dual display mode.

4. The information handling system of claim 1 wherein the one or more predetermined factors comprises detection of a folded configuration, the virtual bezel defining dual display mode presentation areas within first and second perimeters defined by the virtual bezel.

5. The information handling system of claim 1 wherein the one or more predetermined factors comprises touches detected at the touchscreen display.

6. The information handling system of claim 1 wherein the one or more predetermined factors comprises detection of landscape or portrait orientation.

7. The information handling system of claim 1 wherein an end user selects presentation of the virtual bezel and the one or more predetermined factors comprises context associated with end user virtual bezel presentation selection.

8. The information handling system of claim 1 wherein:
the one or more predetermined factors comprises touches detected at one side of the display; and
the virtual bezel comprises a non-touch zone proximate the one side of the display.

9. A method for content presentation at an information handling system foldable display, the method comprising:
folding the display along a seam;

presenting visual information at the display in a dual display mode having a first display portion defined at one side of the seam and a second display portion defined at a second side of the seam, the first display portion outlined by a first virtual bezel, the second display portion outlined by a second virtual bezel;

removing the first and second virtual bezels after a predetermined time associated with end user orientation to the first and second display portions;

detecting a display event; and in response to the display event, adapting the presenting visual information relative to the seam;

wherein the display event includes at least unfolding the display to a flat configuration, the adapting including at least presenting the visual information across the seam with the display having a single display portion.

10. The method of claim 9 further comprising:
changing the display orientation; and
in response to detecting the changing orientation, adapting the presenting visual information by rotating the orientation of content presented on each side of the seam.

11. The method of claim 9 further comprising:
changing the display orientation;
in response to detecting the changing orientation, adapting the presenting visual information by presenting content in a single display mode.

12. The method of claim 9 further comprising:
changing the display orientation; and
in response to detecting the changing orientation, presenting a virtual bezel at the display for a predetermined time and removing the virtual bezel after the predetermined time.

13. The method of claim 12 wherein the virtual bezel comprises a bezel that forms a perimeter about each of the first and second sides of the seam.

14. The method of claim 9 further comprising:
changing one or more applications executing on the information handling system; and
in response to detecting the changing one or more applications, updating a virtual bezel presented at the foldable display.

15. The method of claim 14 wherein the updating the virtual bezel further comprises setting a touch rejection for the virtual bezel.

16. The method of claim 14 wherein the updating the virtual bezel further comprises defining a single display that encompasses both sides of the seam.

17. The method of claim 9 further comprising:
unfolding the display to remove the seam; and
in response to detecting the unfolding the display, updating a virtual bezel to encompass the display in a single display mode.

18. An information handling system having non-transitory memory storing instructions, the instructions when executed on a processor:
querying a fold state of a foldable display to determine a flat configuration or a folded configuration, the foldable display folding at a seam;
querying an orientation state of the foldable display;
querying an application stack state of the foldable display;
applying the fold state, orientation state, and application stack state, to define a virtual bezel at the foldable display;

in the flat configuration, presenting content at the foldable display in a single display zone that proceeds across the seam and a virtual bezel around the perimeter of the foldable display;

in the folded configuration, presenting the content at the foldable display in first and second zones divided by the seam and having the virtual bezel over the seam to preclude presentation of the content over the seam; and removing the virtual bezel from the foldable display after a predetermined time associated with end user orientation to the display zones.

19. The information handling system of claim 18 wherein the virtual bezel defines first and second display zones, each display zone on one side of a seam defined by a fold of the foldable display.

* * * * *